United States Patent [19]
Nilsson

[11] Patent Number: 4,519,104
[45] Date of Patent: May 28, 1985

[54] DEVICE FOR COLLECTING SOLID OR FLUID WASTE

[75] Inventor: Karl I. Nilsson, Linköping, Sweden

[73] Assignee: Klintland, Sweden

[21] Appl. No.: 474,572

[22] PCT Filed: Jul. 3, 1982

[86] PCT No.: PCT/SE82/00225
§ 371 Date: Feb. 18, 1983
§ 102(e) Date: Feb. 18, 1983

[87] PCT Pub. No.: WO83/00082
PCT Pub. Date: Jan. 20, 1983

[30] Foreign Application Priority Data
Jul. 3, 1981 [SE] Sweden ............... 8104145

[51] Int. Cl.³ .................................. A47K 11/00
[52] U.S. Cl. ........................................... 4/484
[58] Field of Search ............................... 4/484

[56] References Cited
U.S. PATENT DOCUMENTS

| | | | |
|---|---|---|---|
| 3,452,368 | 7/1969 | Couper | 4/484 |
| 3,648,302 | 3/1972 | Winters | 4/484 |
| 3,665,522 | 5/1972 | Backlund et al. | 4/484 |
| 3,693,193 | 9/1972 | May | 4/484 |
| 3,878,572 | 4/1975 | Eriksson | 4/484 |
| 4,025,969 | 5/1977 | Dahlen | 4/484 |

FOREIGN PATENT DOCUMENTS
311733  6/1969  Sweden ............... 4/484

Primary Examiner—Charles E. Phillips
Attorney, Agent, or Firm—Hayes, Davis & Soloway

[57] ABSTRACT

This invention relates to a device for collecting solid or fluid waste on which one end of a tube (7) made by thin, flexible and preferably impermeable material of considerable length which is folded or pleated in an accordian-like fashion and kept outside a funnel-shaped body (4), from where it is advanced over the upper edge of the body (4) through a duct (5) through the body (4). Under the duct (5) there is a waste-receiving chamber to which the tube (7) is advanced by means of the duct (5) and a feed mechanism (8) arranged to feed a predecided length of the tube (7) and its contents into the waste receiving chamber. The feeding mechanism (8) consists of two opposite rollers (16, 17) which are transversed in relation to the feeding direction of the tube (7) and between which the tube (7) is advanced and which are brought to rotate in opposite directions at mainly equal speed in the feeding movement and which are equipped with radially pertruding flanges (18) which are elongated along the full length of said rollers. According to the invention the rollers (16, 17) of which at least one is mounted to allow it to springingly be slid in one direction transverse to said feeding direction at least as much as equal to the smallest elongation of the cross-section of the duct (5). Furthermore the radially pertruding flanges (18) at the gables of the rollers (16, 17) are equipped with tilted sliding surfaces (29) onto which the points of the flanges of the other roller are arranged to slide when the rollers rotate allowing a space to arise for the collected waste between the flanges (18) during the feeding.

1 Claim, 7 Drawing Figures

DEVICE FOR COLLECTING SOLID OR FLUID WASTE

The present invention relates to a device for collecting solid or fluid waste on which one end of a tube made by thin, flexible and preferably impermeable material of considerable length, which is folded or pleated in an accordion-like fashion and kept outside a funnel-shaped body, from where it is advanced over the upper edge of the body through a duct through the body in addition to which under the duct there is a waste-receiving chamber to which the tube is advanced by means of the duct and a feed mechanism arranged to feed a pre-decided length of the tube and its contents into the waste receiving chamber, where said feeding mechanism consists of two opposite rollers which are transverse in relation to the feeding direction of the tube and between which the tube is advanced and which are brought to rotate in opposite directions at equal speed in the feeding movement and which are equipped with radially pertruding flanges which are elongated along the full length of the rollers.

There are several known embodiments of such waste-receiving devices which are used to pack waste from public conveniences, industries or hospitals in a hygienic and non-polluting manner. Particularly in connection with the first mentioned range of application it appears that people allow such big objects, e.g. beer cans etc., to get into the duct of the waste-receiving chamber by negligence or destructiveness so that the function of the feeding mechanism is jeopardized. It is obvious that this puts into trouble both those that later want to use the waste-receiving device and those whose job it is to do something about possible disturbances of the function.

The object of the present invention is to achieve a waste-receiving device as described by way of introduction which is constructed so that the feeding mechanism unimpededly lets through waste or other objects which can get through said duct and this is enabled by the radially protruding flanges at the gables of the rollers are equipped with tilted sliding surfaces onto which the points of the flanges of the other roller are arranged to slide when the rollers rotate allowing a space to arise for the collected waste between the flanges during the feeding. Hereby one achieves a safe feeding of the waste and a reduced part of air in the waste fed into the tube.

According to another special characteristic of the invention at least one of its rollers is mounted in bearings to allow it to springingly be slid in one direction transverse to said feeding direction at least as much as equally to the smallest elongation of the cross section of the duct.

By making the spring suspension adjustable and the bearing of the rollers of the feeding attachment in such a way that the axle of one or both of the rollers can be tilted, according to other special characteristics of the invention, the waste-receiving device can be partly adapted to particular types of wastes, at the same time as a certain labyrinth action between the rollers, their flanges and the tube creates such a seal that nasty-smelling gases cannot get out of the part of the tube which is in the waste-receiving chamber, and partly objects which could jeopardize the function of the feeding mechanism can easily pass through said mechanism.

Even though this invention in the following will be explained in connection with drawings that show the invention applied on a toilet of the dry type, it is obvious that the invention must not be apprehended as limited only to this application. On the contrary a man skilled in the art can achieve the necessary modifications for the waste receiving device to be used for collecting polluting waste from industries or hospitals, within the scope of the invention.

On the enclosed drawings.

Figure 3:
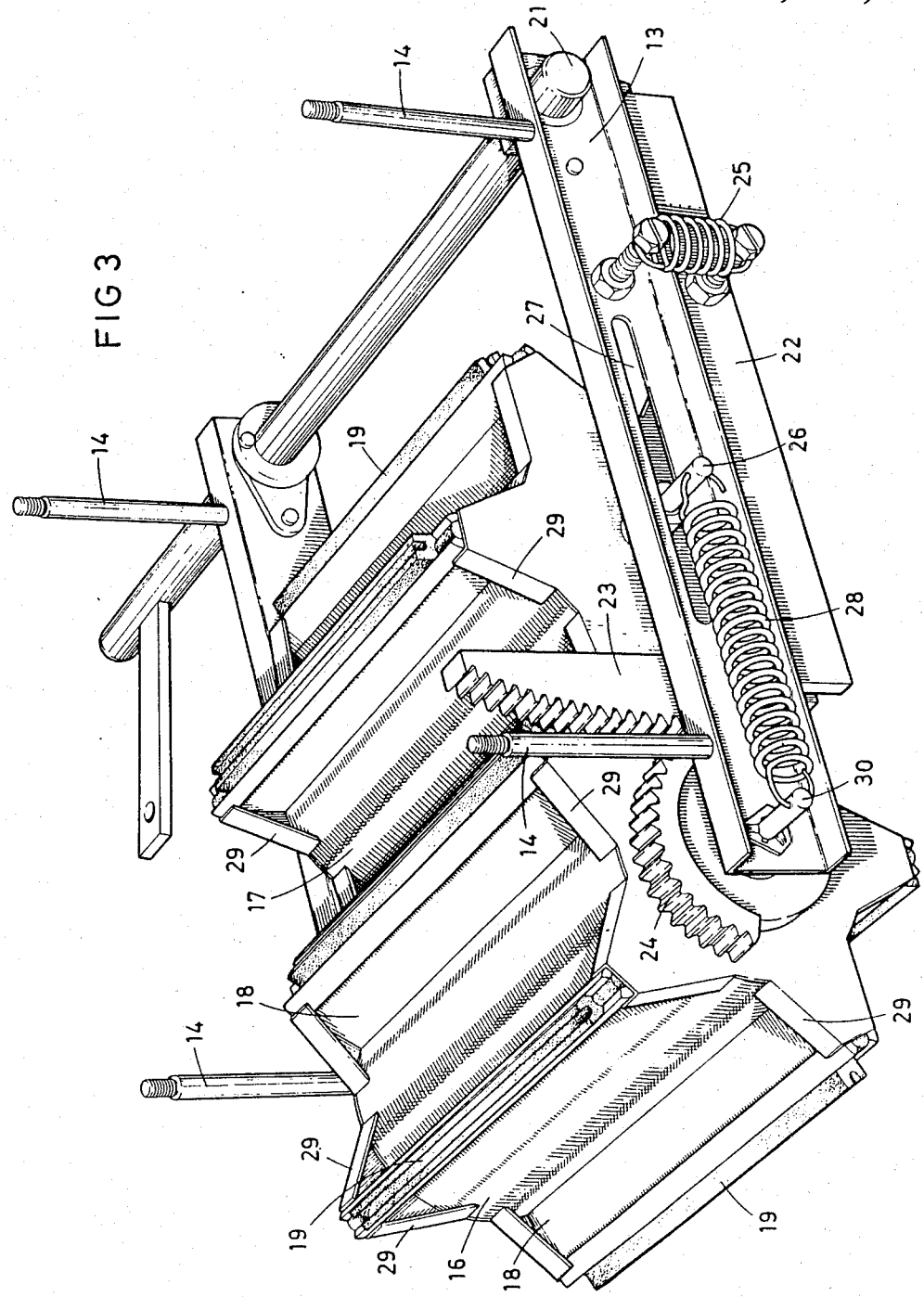
Figure 4:
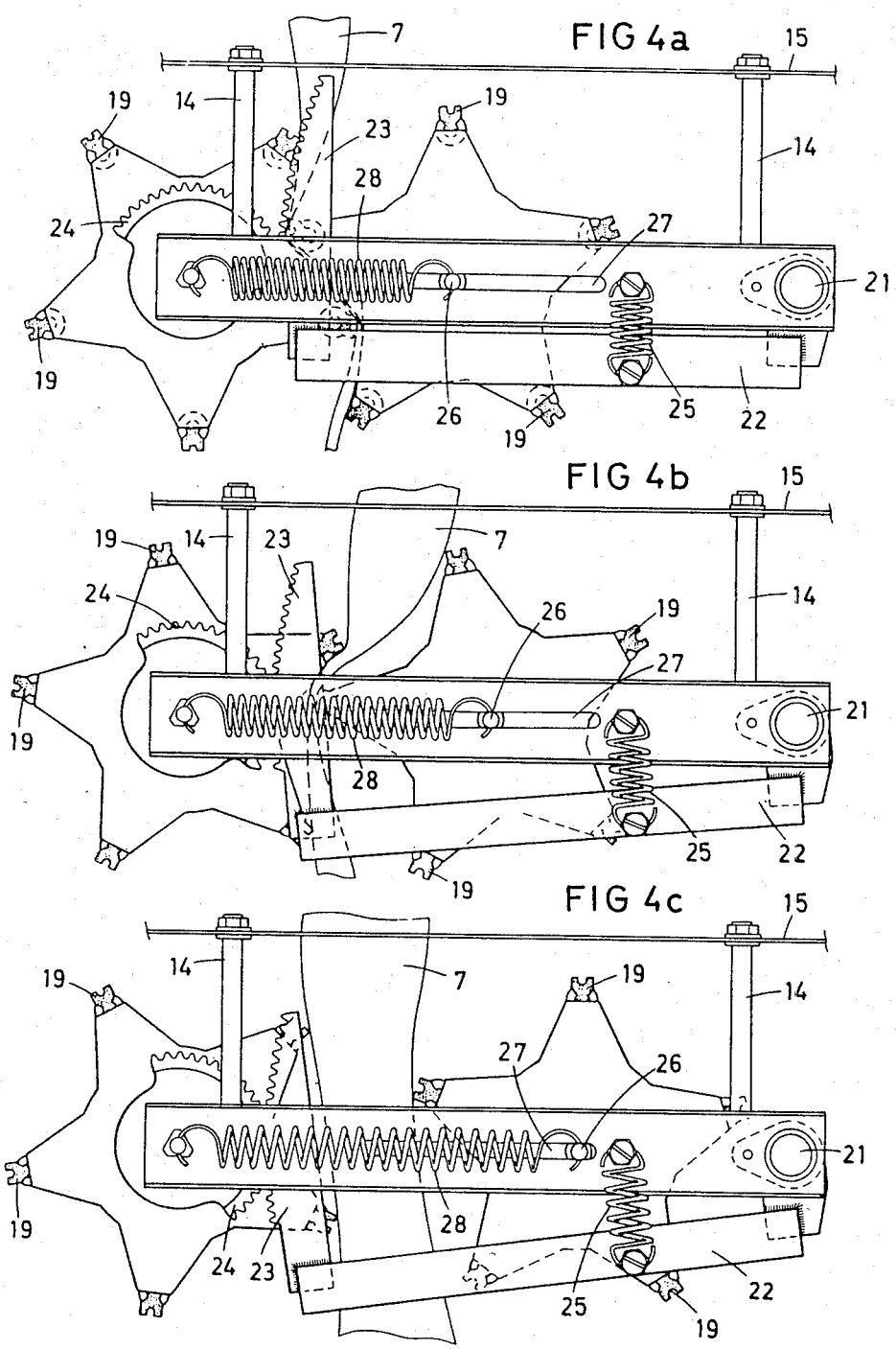

FIG. 3 views the design of the feeding mechanism of the toilet from above obliquely and from the side and FIGS. 4a, 4b, 4c views its function.

Figure 5:
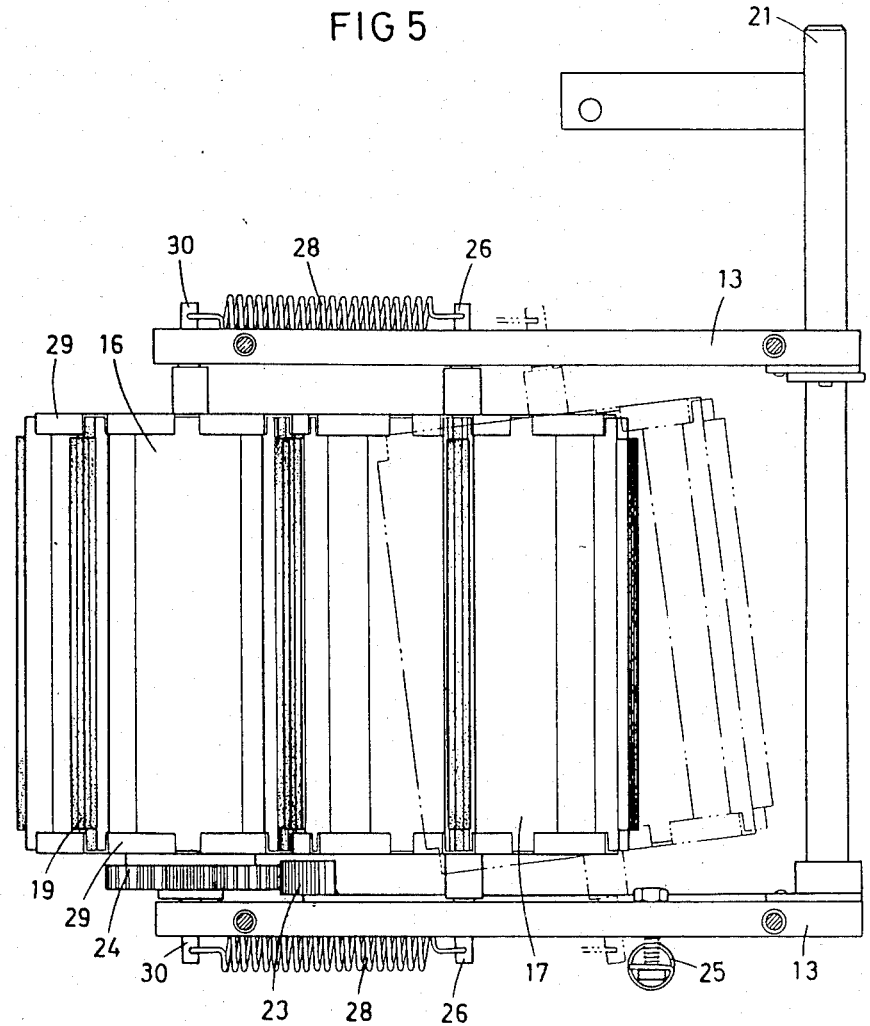

FIG. 5 illustrates how one of the rollers from the feeding mechanism is springingly mounted in bearings so that its axle can be tilted according to the invention.

Figure 1:
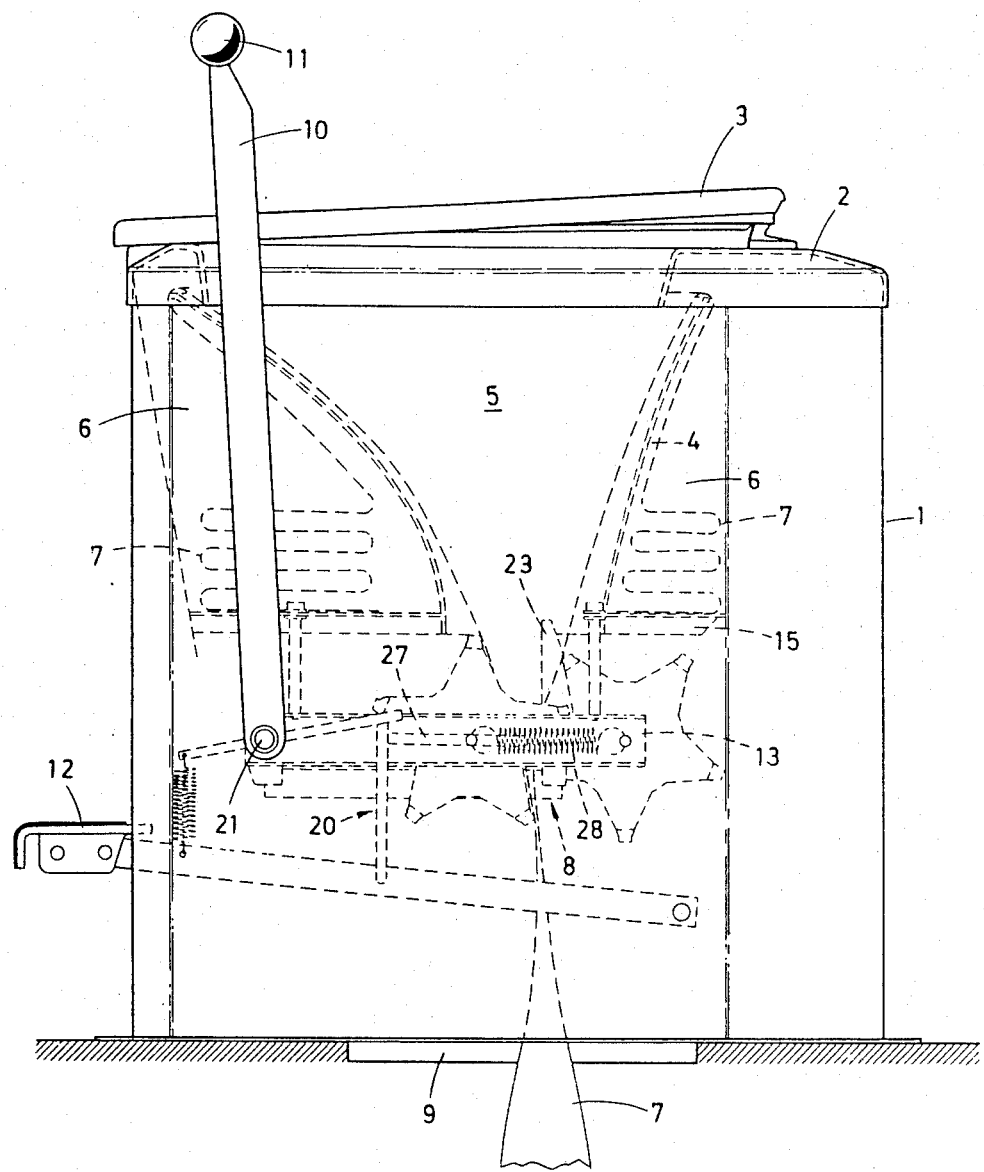
FIG. 1 shows schematically and in a side view a toilet of the dry type designed according to this invention.
Figure 2:
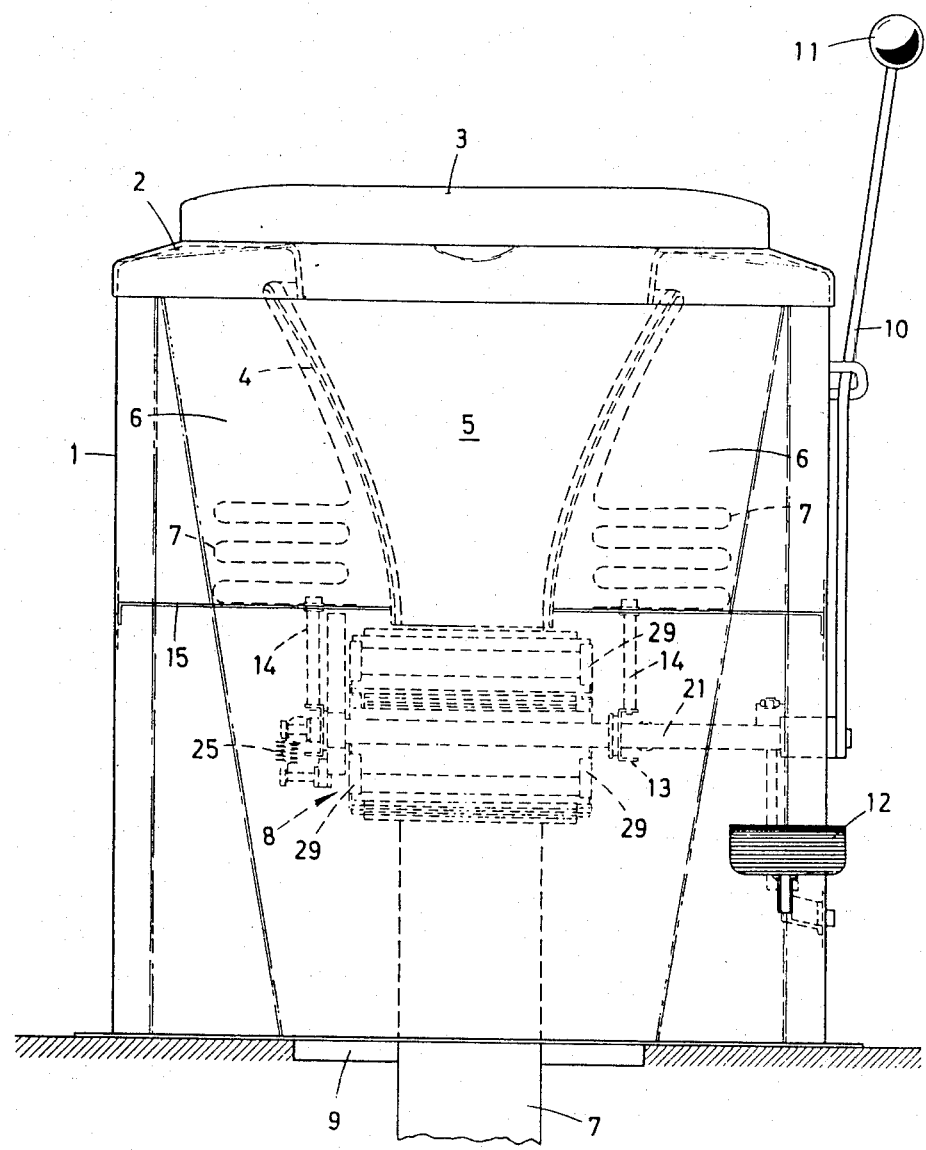
FIG. 2 shows the toilet in FIG. 1 in a front view.

In FIGS. 1 and 2 the numeral 1 designates a container, which is intended to serve as a framework for a lavatory and which at the top has a toilet seat 2 and a lid 3 fitted to it. In the container 1 there is a funnel-shaped body 4, which serves as lavatory bowl and has got a vertical duct 5 through the body. Between the container 1 and the lavatory bowl 4, there is a storage space 6 for a folded tube 7 of which one end is advanced over the edge of the lavatory bowl 4, through the duct 5 and through a feeding mechanism 8 under the bottom mouth of the duct 5 and further on through an opening 9 in the bottom of the container 1 down into a waste-receiving chamber which is not shown. The feeding mechanism 8 is arranged to feed a pre-decided length of the tube 7 with its contents into the waste-receiving chamber, when actuated by a bar 10 with a handle 11 or by a pedal 12.

The design of the feeding mechanism 8 is most evident in FIG. 3 and it consists of a bay frame 13 which is fixed to a horizontal partition 15 in the container 1 by means of four screws 14, just under the bottom mouth of the duct 5. The bay frame 13 upholds two opposite rollers 16 and 17 which are transversed in relation to the downward going feeding direction of the tube 7 and between which the tube 7 is advanced. The rollers 16, 17 are equipped with radially pertruding flanges 18 which are elongated along the full length of said rollers and the edges of said flanges which point out from each of said rollers are equipped with ledges 19 made of plastic or rubber. The profile of the ledges 19 are specially designed to give a good engagement against the tube 7 and to, by means of the previously said labyrinth action, cause a good seal. The downwards feeding movement of the rollers 16, 17 is either caused by stepping on the pedal 12 or pushing the bar 10 away from oneself. The movement from the bar 10 is transferred directly, and from the pedal 12 by means of a linkage 20, to an axle 21 mounted in bearings in the bay frame 13 which in turn by means of a lever 22 is operatively connected with a toothed segment 23. This meshes with another toothed segment 24 which is arranged to by means of a retaining mechanism, not shown in the construction drawing, to cause a clockwise rotation of the roller 16 and thereby also a rotation in counter clockwise direction of roller 17. Every full downward feeding movement of the pedal 12 or the bar 10 corresponds to the downward feeding retracting spring 25 that works between the lever 22 and the bay 13 causes the participating parts in the downward feeding movement to return to their respective output position after the downward feeding movement is completed.

According to the invention the flanges 18 at the ends of the rollers 16, 17 are equipped with tilted sliding surfaces 29. While the rollers 16, 17 rotate, the edges of the flanges 18 of each roller slide on the said sliding surfaces 29 on the opposite roller. Thus between the flanges and surface of the rollers, respectively, a space arises in which the tube 7 with the waste can pass during the downward feeding. At the downward feeding movement through the influence of the sliding surfaces 29, the flanges 18 on each roller will press against each other so much that the waste is somewhat compressed and the major part of the air in the waste is pressed out and the tube 7 will hereby get a satisfactory volumetric efficiency.

At least one of the rollers 16, 17 is mounted to allow it to springingly be slid in a direction transverse to the feeding direction at least as much as equal to the smallest elongation of the cross-section of the ducts 5. According to the design of the invention shown in the construction drawing the ends of the axle 26 on roller marked with the numeral 17 is mounted in slot-shaped openings 27 in two corresponding frame parts of the bay frame 13, so that roller 17, can be moved in the direction away from roller 16, counteracted by the tension springs 28 working between axle 26 and axle 30 of rollers 16 under the influence of the waste which is in tube 7 will pass between the rollers 16, 17. The length of the slots are at least equal with the smallest elongation of the cross-section of the duct 5. By means of the said design of the mounting of roller 17 this also has the possibility to be tilted as viewed in FIG. 5. The spring power of the springs 28 are preferably adjustable as regards different types of waste.

With reference especially to FIGS. 4a-4c a downward feeding movement will now be described:

In FIG. 4a the part of the tube 7 which is above the feeding mechanism 8 has not yet been filled with waste and runs empty in a zig-zag shape between the ledges 19 on the radially pertruding flanges 18 of the roller 16 and 17. Hereby a satisfactory sealing is achieved between the parts of the tube 7 which are over and under, respectively, the feeding mechanism 8. The downward feeding movement is, as mentioned, achieved by the manoeuvering of the bar 10 or the pedal 12, whereby the lever 22 is turned downwards. The feeding movement is transferred to the toothing segment 24 by means of the toothing segment 23 and results in a clockwise rotation of roller 16. By means of the comparatively high friction between the ledges 19 or roller 16 and the tube 7 the latter will gradually be fed downwards. Hereby roller 17 is also forced to rotate, partly as a result of the friction between the tube 7 and the ledges 19 on roller 17 and partly by means of the flanges 18 on both rollers which mesh into each other. Hereby the waste will so to say be portioned by the previous said space defined by the envelope surfaces of the roller 16, 17 and the flanges 18 as the ledges on the outer edges of the flanges 18 slide along the sliding surfaces 29.

If the waste now includes such objects which will not be compressed in said spaces, e.g. beer cans, roller 17 will be pushed to the right as viewed in FIG. 4c to allow the object in question to press through the roller 16, 17 of the feeding attachment without causing stoppage.

What is claimed is:

1. In a device for collecting solid or fluid waste in a tube formed of thin flexible impermeable material of considerable length, the tube being stored in a folded or pleated accordian-like fashion and kept outside of a funnel shaped body, the tube being arranged to be advanced over the upper edge of the funnel-shaped body and through a duct exiting from the bottom of the funnel shaped body, a waste receiving chamber positioned below the duct into which the flexible tube is advanced through the duct by means of a feed mechanism, said feed mechanism being arranged to feed a predetermined length of tube and its contents into the waste-receiving chamber, and said feeding mechanism comprises two oppositely mounted rollers which are positioned transverse to the feeding direction of the tube, said rollers serving to advance the tube when the rollers are rotated at essentially equal speed in opposite direction, said rollers being equipped with radially protruding flanges which extend along the full length of the rollers, the improvement wherein the rollers are provided at each end with tilted sliding surfaces against which the outer radial ends of the radial flanges of the other roller are arranged to slide as the rollers rotate, said sliding surfaces being arranged at an angle to the radial direction of each associated flange so as to provide a space for collected waste between the radial flanges as the rollers rotate, each flange being provided with a sealing tip extending axially between the sliding surfaces for engaging the tube extending over the surface of the adjacent roller to provide for sealing of the tube.

* * * * *